United States Patent
Bonic

(10) Patent No.: US 12,243,134 B2
(45) Date of Patent: Mar. 4, 2025

(54) AUTOMATED IMAGE SYNTHESIS AND COMPOSITION FROM EXISTING CONFIGURATION FILES AND DATA SETS

(71) Applicant: Red Hat, Inc., Raleigh, NC (US)

(72) Inventor: Sanja Bonic, Vienna (AT)

(73) Assignee: Red Hat, Inc., Raleigh, NC (US)

( * ) Notice: Subject to any disclaimer, the term of this patent is extended or adjusted under 35 U.S.C. 154(b) by 179 days.

(21) Appl. No.: 17/971,866

(22) Filed: Oct. 24, 2022

(65) Prior Publication Data

US 2024/0135609 A1 Apr. 25, 2024
US 2024/0233221 A9 Jul. 11, 2024

(51) Int. Cl.
| | | |
|---|---|---|
| *G06F 16/50* | (2019.01) | |
| *G06F 16/383* | (2019.01) | |
| *G06F 40/40* | (2020.01) | |
| *G06T 11/00* | (2006.01) | |
| *G06T 11/60* | (2006.01) | |

(52) U.S. Cl.
CPC ............ *G06T 11/60* (2013.01); *G06F 16/383* (2019.01); *G06F 40/40* (2020.01); *G06T 11/001* (2013.01)

(58) Field of Classification Search
CPC .... G06F 16/532; G06F 16/54; G06F 16/9038; G06F 3/04842; G06F 40/253; G06F 40/30; G06F 16/243; G06F 16/383; G06F 40/40; G06F 3/04845; G06F 16/58; G06T 11/60; G06T 11/001
See application file for complete search history.

(56) References Cited

U.S. PATENT DOCUMENTS

| | | | |
|---|---|---|---|
| 9,412,366 B2 | 8/2016 | Wilensky et al. | |
| 10,579,737 B2 | 3/2020 | Brixey et al. | |
| 10,977,303 B2 | 4/2021 | Wu et al. | |
| 11,073,975 B1* | 7/2021 | Mueller | G06F 3/04847 |
| 2016/0358360 A1* | 12/2016 | Wildey | G06T 3/40 |
| 2021/0224877 A1* | 7/2021 | Zheng | G06T 7/0004 |
| 2022/0067992 A1 | 3/2022 | Xu et al. | |
| 2023/0237709 A1* | 7/2023 | Xu | G06T 11/00 345/625 |

FOREIGN PATENT DOCUMENTS

| | | |
|---|---|---|
| CN | 113822957 A | 12/2021 |
| WO | 2019044064 A1 | 3/2019 |

OTHER PUBLICATIONS

Shorten, Connor. "Text to Image", Towards Data Science, Jan. 25, 2019, 9 pages (located on the Internet at: https://towardsdatascience.com/text-to-image-a3b201b003ae ).

* cited by examiner

Primary Examiner — Hau H Nguyen
(74) *Attorney, Agent, or Firm* — Womble Bond Dickinson (US) LLP

(57) ABSTRACT

A system and method of image synthesis and composition from configuration files and data sets. The method includes specifying one or more image definitions. The method includes specifying one or more sets of attributes associated with the one or more image definitions. The method includes searching an image dataset, by a processing device, using the image definitions and the sets of attributes, for one or more image files associated with the one or more image definitions. The method includes retrieving the one or more image files from the image dataset. The method includes composing an editable picture using one or more image objects obtained from the one or more image files, and the one or more sets of attributes.

20 Claims, 6 Drawing Sheets

200

210

AUTOMATED IMAGE SYNTHESIS AND COMPOSITION FROM EXISTING CONFIGURATION FILES AND DATA SETS

TECHNICAL FIELD

Aspects of the present disclosure relate to image synthesis and composition from configuration files and data sets.

BACKGROUND

Creation of diagrams and visualizations can take a long time and require support from others. In large organizations, that can also require creating tickets and allocating creation time for those visual resources to illustrate documentation, presentations, and other forms of content. Additionally, many organizations subscribe to stock photography services and have specific brand guidelines that can present compliance challenges.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

DETAILED DESCRIPTION

Figure 1:
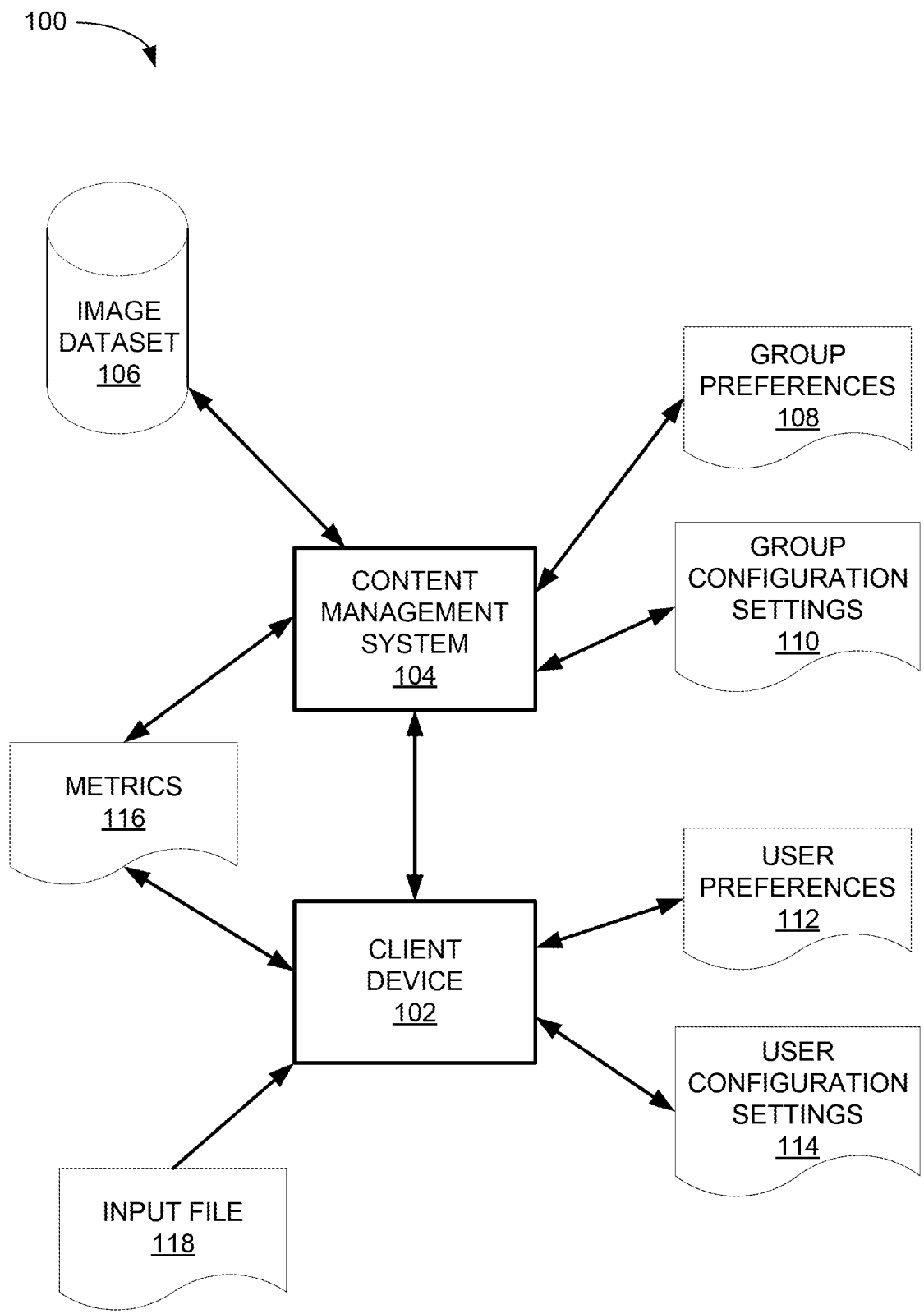
FIG. 1 is an illustration of an example of an image synthesis and composition architecture, in accordance with embodiments of the disclosure.

Page composition can be difficult, especially if it involves obtaining graphical images and their placement within a composition. Composing a page of graphics, e.g., a Microsoft PowerPoint™ slide, can involve struggling to find images, laying them out on a page, and then polishing the page with borders, titles, and other elements, all of which can be complicated as well as require extensive training. Even specifying an image for search can be challenging. For example, thousands of images of "a balloon," or even "a red balloon," may exist. However, "a red balloon as seen from overhead," may be far more difficult to search. Specifying multiple images, e.g., "a red balloon as seen from overhead, with a background of snow-covered mountains," may require retrieval of multiple images, re-oriented and layered on top of one another. While some applications may be able to generate visual attributes, e.g., with Cascading Style Sheets (CSS) for HyperText Markup Language (HTML)-based websites, and LaTeX with appropriate templates for documents, it can be difficult to produce a visualization using a textual description. Users can be required to scroll through hundreds, if not thousands, of candidate images. Should appropriate images be obtained, composing them, as image objects, in a picture can become an additional challenge. Furthermore, conventional systems may not place any constraints on the elements, and their placement, as used in a composition, leading to inconsistent "styles" or the use of unlicensed artwork. Once a composition has been finalized, conventional systems do not provide a mechanism for sharing the elements of the composition with other users, nor do they provide metrics on the use of such systems.

Aspects of the present disclosure address the above-noted and other deficiencies by providing an automated image synthesis and composition system. Benefits of the embodiments of the present disclosure for an automated image synthesis and composition system include more effective image searching, more effective compositing, more consistent compositing, metrics that can advise an organization on the value of image datasets they may use, and an ability to share work products with other users.

As discussed in greater detail below, an automated image synthesis and composition system may include a collection of servers that provide one or more services to one or more client devices. The automated image synthesis and composition system may receive a request from a client device for one or more images. The request may include one or more image definitions along with attributes associated with each of the image definitions. The automated image synthesis and composition system may maintain in an image dataset, e.g., a database or memory, a collection of image files that can be associated with the image definitions. Using the image definitions and attributes, the automated image synthesis and composition system may search the dataset for image files meeting the image definition criteria. The automated image synthesis and composition system may then return, to the client device, image files retrieved from the image dataset, and use the image files and image attributes to compose an editable picture.

Although aspects of the disclosure may be described in the context of automated image synthesis and composition from configuration files and data sets, embodiments of the disclosure may be applied to any computing system that controls visual outputs through image composition.

FIG. 1 is an illustration of an example of an image synthesis and composition architecture, in accordance with embodiments of the disclosure. In some embodiments, a client device transmits a request comprising image definitions to a content management system 104 for a set of image files. In some embodiments, the image files are retrieved from an image dataset 106. The image dataset 106 may be a public dataset, a dataset private to an organization, or some combination of the two. In some embodiments, the datasets available to a user or to a group are specified in a group configuration settings 110 or a user configuration settings 114. In some embodiments, the client device 102 accesses the content management system 104 through a web browser and retrieves and manipulates the image files via a plugin. In some embodiments, a user on the client device 102 uses a graphical user interface (GUI) on the plugin to specify image objects, obtained from image files, and their coordinates for a composition. In some embodiments, textual information is provided to the plugin, via a prompt, to select the desired image objects. Textual information can also be provided via a configuration file. In some embodiments, information can be provided to the plugin by voice, e.g., to accommodate individuals with visual disabilities.

In some embodiments, natural language processing (NLP) is used to translate the image definitions to retrieve images from an image dataset 106. In some embodiments, these datasets are public datasets. In some embodiments, image search is restricted to licensed datasets. In some embodiments, the inventory and layout of the picture elements are stored to and/or retrieved from user preferences 112. In some embodiments, system-wide or group-wide preference settings are stored as group preferences 108. In some embodiments, user preferences 112 and group preferences 108 control the images available to the plugin. In some embodiments, the group configuration settings 110 and user configuration settings 114 enforce layout conventions. In some embodiments, the plugin can scale and orient (either relatively or absolutely) the images in a composition. Other editing capabilities for the images are contemplated, such as color, layering, element ordering, and overall sizing. In some embodiments, the set of image objects can be moved and arranged within the composition.

In some embodiments, after a set of image objects have been composed, metadata associated with the set of image objects and their source files can be saved to user preferences 112. In some embodiments, multiple forms of user preferences 112 are available to a user on a client device 102, e.g., a user preferences file. In some embodiments, metadata can be saved to group preferences 108. In some embodiments, metrics on the images, their orientation, final compositions, and source files are saved to a metrics file 116 that can be used to improve the aggregate user experience for users. These metrics can include the pictures and any layering used in the final composition, sizing, coloring, positioning, and additional atmospheric components, such as transparent overall layers that correlate with faded memories, gloom, and other attributes commonly found in sentiment analysis. In some embodiments, image object transparency can be adjusted. In some embodiments, the processing logic can learn from users as to what constitutes a pleasing layout and suggest similar elements and orientations to other users. In some embodiments, this information is stored with the group preferences 108.

In some embodiments, a user using an editor in a content management system 104 describes in words (or clicks through a GUI to describe) that the user wants a picture including a laptop and an arrow pointing to the right. In some embodiments, the plugin can provide suggestions for elements to be included in the final picture. In some embodiments, the user can make selections from the suggestions. In some embodiments, an advanced user can directly edit an input file 118 and submit it to the automated image synthesis and composition system. An example of the contents of an input file 118 is:

---
laptop;0;0;10%;1;1
[arrow horizontal right];12%;0;10%;1;1

---

In the example, provided the input file 118 as an input, the client device 102 will request, from the image dataset 106, an image of an arrow and an image of a laptop and compose them in a drawing. In some embodiments of the configuration elements, the syntax "laptop;0;0;10%;1;1" causes the processing logic to retrieve an image of a laptop from the dataset, positioning its most left-bottom pixel at x-coordinate 0 and y-coordinate 0, sizing it to 10% of the overall picture, meaning it would take up only a small portion of the bottom left quadrant of the final composition, ensuring that it is not transparent (opacity value of 1), and specifying a z-index of 1, meaning it would be layered as the first picture in an overall composition. For the example element "[arrow horizontal right];12%;0;10%;1;1", brackets can be used to describe a word group that belongs together, specifying an x-coordinate at 12% (that would be pixel 12 in a final rasterized 100-pixel picture), y-coordinate 0, 10% size, opacity 1, and z-index 1.

A specification of desired images for a page composition may include attributes of subject, color, orientation, or size. The specification may declare that images should be of a particular type, e.g., bitmap or vector. A desired image may also include combinations of objects, e.g., a small girl staring at the moon. The sources of these images may be public repositories, e.g., images that have been placed in the public domain. In some embodiments, the images may require licensing. In some embodiments, an organization may wish to restrict the use of images to a particular set of images. Some embodiments connect existing public data sets with private data sets to enhance the variety of created images.

Some embodiments extend functionality by associating images with additional metadata, e.g., creating more atmospheric scenarios (through annotations created with sentiment analysis or manually annotated), or by adding transparency values to existing layers. In some embodiments, individual picture element transparency can be added to existing layers. Transparency can specify a degree to which a picture element that is occluded by another picture element, can show through the occluding picture element.

Figure 2A:
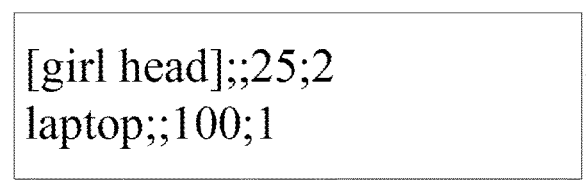
FIG. 2A is an illustrative example of the contents of an input file provided to an automated image synthesis and composition architecture, in accordance with embodiments of the disclosure.

FIG. 2A is an illustrative example 200 of the contents of an input file 202 provided to an automated image synthesis and composition architecture, in accordance with embodiments of the disclosure. In the example input file 202, the first line, "[girl head];;25;2", represents an instruction to search an image dataset for an image of a "girl," in which brackets can be used to describe a word group that belongs together. In the example, the dataset can be the image dataset 106 of FIG. 1. In this example input file 202, the author is requesting an image of the head of a girl. In the example, the "25" in the first line represents an instruction to specify an opacity value of 25, and the trailing "2" represents an instruction to specify a z-index of 2, meaning that the image should be layered as the second picture in an overall composition.

In the example input file 202, the second line, "laptop;; 100;1", represents an instruction to search a dataset for an image of a laptop, and specifies an opacity value of 100 and further specifies, via the trailing "1," that the image should be layered as the first picture in an overall composition.

Figure 2B:
FIG. 2B is an illustrative example of the results of an input file as provided to an automated image synthesis and composition architecture, in accordance with embodiments of the disclosure.

FIG. 2B is an illustrative example 210 of the results of the input file 202 of FIG. 2A, as provided to an automated image synthesis and composition architecture, in accordance with embodiments of the disclosure. As shown in the example, an editable picture 210 includes an image of a laptop and the head of a girl.

Figure 3:
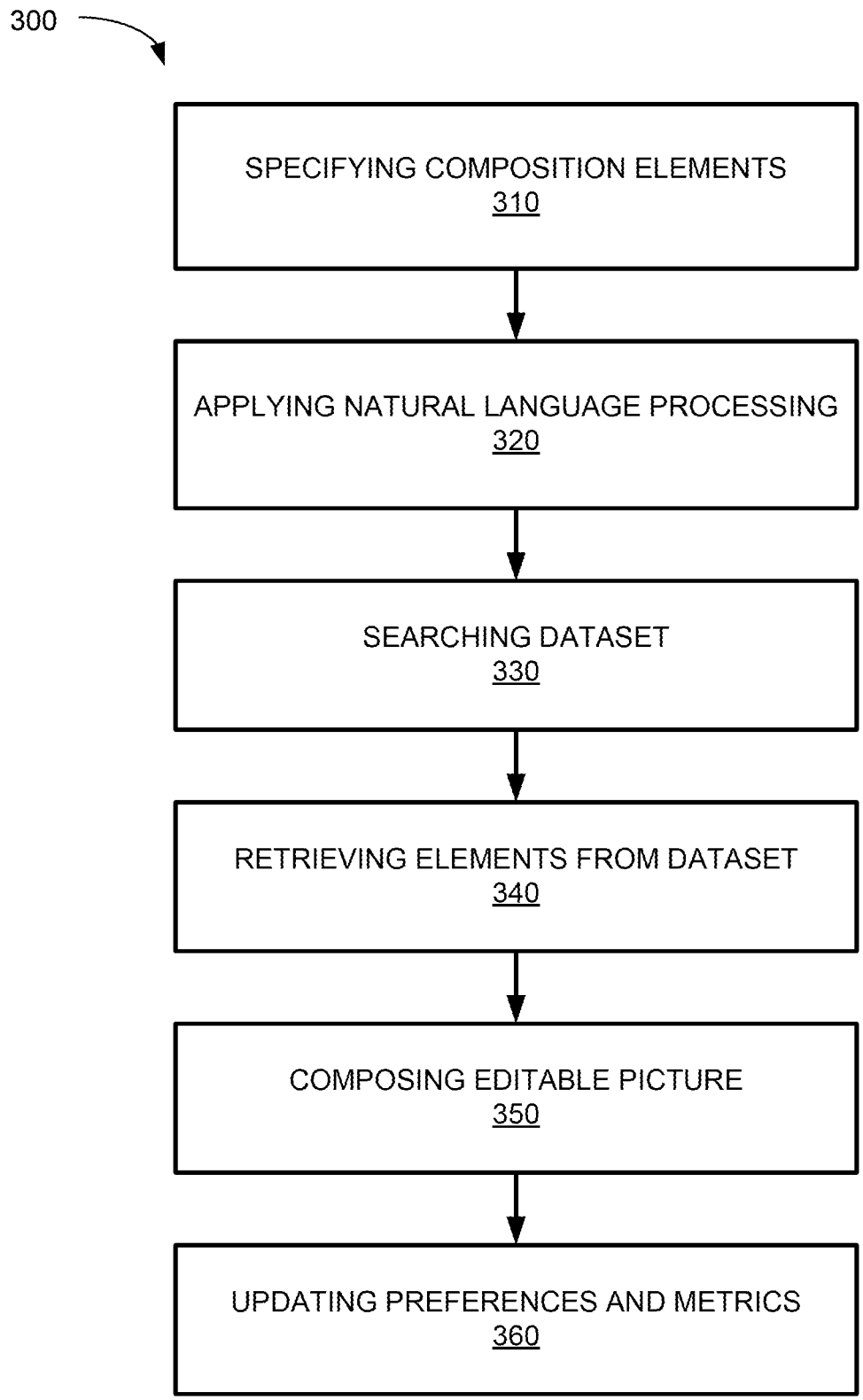
FIG. 3 is a flow diagram of a method of composing a picture using an automated image synthesis and composition architecture, in accordance with some embodiments of the disclosure.

FIG. 3 is a flow diagram of a method 300 of composing a picture using an automated image synthesis and composition architecture, in accordance with some embodiments. Method 300 may be performed by processing logic that may comprise hardware, e.g., circuitry, dedicated logic, programmable logic, a processor, a processing device, a central processing unit (CPU), a system-on-chip (SoC), software, e.g., instructions running/executing on a processing device, firmware, e.g., microcode, or a combination thereof. In some embodiments, at least a portion of method 300 may be performed by client device 102 of FIG. 1.

With reference to FIG. 3, method 300 illustrates example functions used by various embodiments. Although specific function blocks ("blocks") are disclosed in method 300, such blocks are examples. That is, examples are well suited to performing various other blocks or variations of the blocks recited in method 300. It is appreciated that the blocks in method 300 may be performed in an order different than presented, and that not all of the blocks in method 300 may be performed.

Method 300 begins at block 310, where the processing logic receives instructions specifying composition elements. The composition elements can include desired images. These instructions may be obtained through an input file for a composition. In the example, the input file can be the input file 202 of FIG. 2. In an example, the composition elements are obtained as a text file previously constructed. In another example, the composition elements are the result of voice commands. In another example, an input file is created and stored by another user. In another example, the input file is created through interaction with a GUI. In another example, the input file is created through interaction with a prompt.

At block 320, the processing logic causes the automated image synthesis and composition system to apply NLP against the composition elements specified in the input to parse the input and transform the composition elements into a format with which a dataset can be searched. In the example, the processing logic splits the words into tokens, using synonyms, word proximity, and declensions to search the available datasets.

NLP can extract relevant tokens from a group of words including their proximity to one another and their intensity. It can help the system or algorithm distinguish nouns from adjectives and adverbs to differentiate where a word belongs, such as in the example "a horse in the white snow." If the words are merely tokenized without NLP, a search could return a white horse rather than white snow. Alternatively, mere tokenizing could result in the word "white" being applied to the background of the composition and omitted from the image search.

Some embodiments learn and use recommendation algorithms, improve NLP results for their use cases, and learn from their own compositing and positioning success, and are able to immediately produce usable results. In addition, some embodiments are format-agnostic with respect to whether the data set(s) and resulting output are rasterized or vectorized.

At block 330, the processing logic searches a dataset to identify images that both satisfy the request and are available under any licensing restrictions of the dataset. The permitted and available datasets can be defined during an initial system setup and can also be defined per usage, e.g., with a checkbox as to whether particular licenses are allowed for use in a final composition, based on an intended end use, e.g., personal use versus sharing in a customer slide set. A user can further refine the elements of a final composition by changing the parameters in their configuration. One configuration can equate to one final composition, either rasterized or vectorized. In some embodiments, a default is specified at a system level and overwritten by the user.

At block 340, the processing logic retrieves the images satisfying the search and returns them to the client device. In some embodiments, images may be cached within a content management system such as the content management system 104 of FIG. 1. In some embodiments, the images may be ordered according to how well they satisfy the attributes of the requested composition elements.

Should appropriate images be obtained, composing them, as image objects, in a picture can become an additional challenge. The image objects may need to be scaled, which may place restrictions on the search criteria, either on the initial search or a revised search. The image objects may need to be layered such that one image partially obscures another. The image objects may need to be reoriented, e.g., rotated 90°. The image objects may need their color changed, assuming an image with a requested color is unlocatable. The image objects may need to be placed on a canvas according to either absolute or relative coordinates, e.g., "in the upper left corner," or "to the left of the image of the laptop." Additional elements conveying further details can be introduced depending on the datasets and their included metadata. In some embodiments, positioning and compositing algorithms are employed to calculate relative or absolute positioning, as well as keep track of the overall composition of a final image.

At block 350, the processing logic applies positioning and compositing algorithms to calculate the relative or absolute positioning of the elements of the composition as well as manage the overall composition of a final image. In some embodiments, the algorithms consider additional elements that may be introduced depending on the dataset(s) and the metadata of the elements. For example, if a certain percentage threshold of individual elements, e.g., picture layers in the final composition, is reached that can be associated with a theme of Halloween, the processing logic can layer additional related elements, e.g., cobwebs or candlelight effects, on top of the other elements in the final composition. A user can configure the system to use these additional suggestions and optionally add them to a configuration. In some embodiments, an internal recommendation algorithm that learns from individual and group preferences is applied while saving the picture/configuration. In some embodiments, this collection of preferences allows other pictures to be composited that share the positioning and compositing attributes and avoid requiring a user to individually manipulate element images and orientation.

In some embodiments, multiple iterations of element selection and positioning can occur. The syntax can introduce an additional parameter that defines the repetition of each element, e.g., a repetition of the element in its defined sizing and coloring along the x- or y-axes, with or without padding, alternate coloring, and other programmatically defined parameters. This can allow the processing logic to remove or modify one line rather than having to repeat the same element throughout the configuration file. Alternatively, the same element can be described with varying coloring, positioning, and sizing parameters.

Additionally, there may be a need to maintain a consistency of style with other sets of pages. Individual preferences may include title blocks, borders, background colors, etc., that an individual wants, by default or by constraint, in a composition. Similarly, an organization may wish to enforce a common layout, e.g., title blocks, borders, background colors, etc., that provide a presentation theme or "style." Organizational preferences or constraints may include approved, or "allowed" image datasets and or "forbidden" or "restricted" datasets. In some embodiments, datasets may be allowed for some individual users and restricted for others.

At block 360, the processing logic updates individual and group preferences to reflect the composition resulting from block 350. In some embodiments, an internal recommendation algorithm that learns from individual and group preferences is applied while saving the picture/configuration. In some embodiments, this collection of preferences allows other pictures to be composited that share the positioning and compositing attributes and avoid requiring a user to individually manipulate element images and orientation.

In some embodiments, an algorithm is applied that saves its own success score, which may be based on an acknowledgement by a user, that can be applied to the composition of future pictures. In an embodiment, the success score is influenced by the number of times a particular configuration is used to create a new picture. This success score, as previously described, can be derived from both individual composition scoring and group composition scoring. In some embodiments, the processing logic can individually disable/override the group composition success score for a user who creates compositions that differ from other users of the same system setup.

Furthermore, because the objects used in the page, the layout, and the polish may be of value to collaborators, one may wish to save the components and their attributes for others to use. Additionally, processing logic may collect metrics, at an individual user basis as well as for a group of users or for all the users of a system. These metrics may influence image recommendations for future image searches, down-rate images that users have found to be unsatisfactory, and up-rate images that one or more users have found to be valuable. These metrics may also provide statistics on the use of particular datasets. For example, an organization may be able to assess the value of a particular licensed dataset in conjunction with the number of images it has provided users as the result of searches and the number of images that users have incorporated into their compositions. These metrics can make the composition process easier for subsequent users, who are able to leverage the creativity of others.

Figure 4:
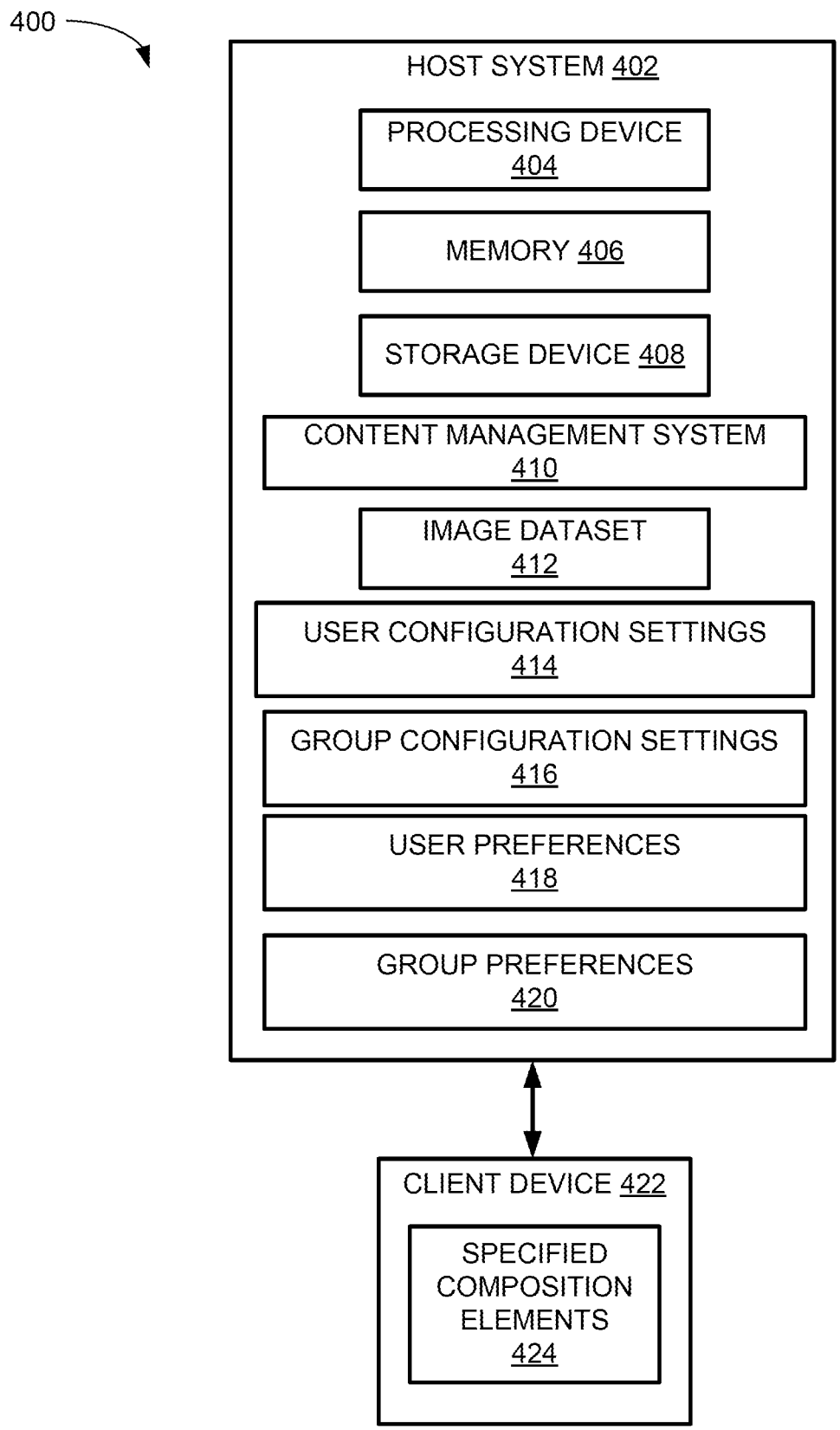
FIG. 4 is a component diagram of an example automated image synthesis and composition architecture, in accordance with some embodiments of the disclosure.

FIG. 4 is a flow diagram of a method 400 of composing a picture using an automated image synthesis and composition architecture, in accordance with some embodiments. Method 400 may be performed by processing logic that may comprise hardware, e.g., circuitry, dedicated logic, programmable logic, a processor, a processing device, a central processing unit (CPU), a system-on-chip (SoC), software, e.g., instructions running/executing on a processing device, firmware, e.g., microcode, or a combination thereof.

With reference to FIG. 4, method 400 illustrates example functions used by various embodiments. Although specific function blocks ("blocks") are disclosed in method 300, such blocks are examples. That is, examples are well suited to performing various other blocks or variations of the blocks recited in method 400. It is appreciated that the blocks in method 400 may be performed in an order different than presented, and that not all of the blocks in method 400 may be performed. In some embodiments, at least a portion of method 400 may be performed by client device 102 of FIG. 1.

Processing logic can include algorithms, software comprising a client-side installation, a client-server service, a library that can be embedded in other software, a framework that can be used to create different embodiments and add-ons, or a plugin to existing software, e.g., plugins to a content management system.

Method 400 begins at block 410, where a user specifies composition elements. In some embodiments, a user specifies with words (or clicks through a GUI) the elements to include in a picture. In some embodiments, voice input can specify the elements.

At block 420, the processing logic applies an NLP algorithm to the specified elements to transform them into a dataset query. Lacking NLP, the words can be used as a literal keyword search. If the processing logic applies NLP, the processing logic can extract relevant tokens from a group of words as well as their proximity, intensity, synonyms, and declensions, and enable better search results and final composition user satisfaction.

At block 430, the processing logic causes a dataset to be searched for the specified elements. The dataset can include public datasets, datasets specific to the organization, and datasets containing licensed materials. The search can cause metrics to be updated, at an individual, group, or system-level.

At block 440, the processing logic causes the result of the dataset search to be retrieved and provided to the user. In some embodiments, group or individual configuration files control what images can be provided to a user.

At block 450, the processing logic composes the composition elements into an editable picture. During this step, the processing logic applies user and group preferences and constraints from the user and group configuration files. The user and group preferences can suggest or enforce layout conventions. Furthermore, user and group preferences can apply layout conventions to an output picture, avoiding the need for a user to manually apply such conventions.

In some embodiments, processing logic can launch a visual editor showing a preview of the final picture in which a user can see other possible options for the otherwise randomly chosen elements as per an NLP-based search, based on the provided data set that is connected to a dataset of image files, which, as an example, could be corporate logos or other identity assets to be used within a corporate environment. This can allow for quick editing and precise positioning of artwork, e.g., presentation slides. It can also be a great option for educators, creators who seek inspiration for rapid prototyping, technical writers, and others who want to create visualizations quickly, without having to spend a lot of time searching for elements, aligning them, and worrying about any licensing of the elements in the picture.

In some embodiments, processing logic can use recommendation algorithms that learn from these individual and group preferences. Such an algorithm can save the combination of an applied configuration to an output picture and can apply these preferences to pictures on a per-user, per-group, or system-wide basis without a user having to manually repeat the positioning and compositing algorithm. In an embodiment, a database or other form of storage can be used to persist individual and group identification, recognized tokens, links to the used pictures, and the combination of properties and pictures used in a final output picture.

At block 460, as a result of the composition, processing logic causes updating of preferences and metrics to capture any changes in user preferences to be reflected in the user and group preferences, as well as update any metrics. In some embodiments, processing logic saves logs of all created files, their initial configuration, and their outcome, including links to the used images, and applies user preferences and group preferences to achieve a final composition.

Processing logic can also cause the composing and editing activities to be recorded as metrics. Processing logic can also use the final composition as input to one or more success score algorithms, which can influence subsequent suggestions for images, other elements, and overall layout against future compositions.

In some embodiments, an algorithm can record its own success score, based on a success acknowledgement by the user as well as the number of times a particular configuration was used by a user, or by a set of users, to create a new picture. If a particular composition for the final output has a low satisfaction rate, determined by the number of times the particular composition was suggested but not accepted, that particular composition can be ranked lower or not suggested again.

FIG. 4 is a component diagram of an example automated image synthesis and composition architecture 400, in accordance with one or more aspects of the present disclosure. However, other automated image synthesis and composition architectures are possible, and the implementation of a computer system utilizing examples of the disclosure is not limited to the specific architecture depicted by FIG. 4. Host system 402 may include processing device 404. Host system 402 may also include memory 406.

It should be noted that although, for simplicity, a single processing device 404 is depicted in host system 402, other embodiments of host system 402 may include multiple processing devices, storage devices, or devices. Processing device 404 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 404 may also include one or more special-purpose processing devices such as an application specific integrated circuit (ASIC), a field programmable gate array (FPGA), a digital signal processor (DSP), or a network processor.

The memory 406 may include volatile memory devices, e.g., random-access memory (RAM), non-volatile memory devices, e.g., flash memory, and/or other types of memory devices. In certain implementations, memory 406 may be non-uniform access (NUMA), such that memory access time depends on the memory location relative to processing devices 404.

In an example, host system 402 may support a content management system 410. In some embodiments, host system 402 may support an image dataset 412. Content management system 410 and image dataset 412 may correspond to content management system 104 and image dataset 106, respectively, of FIG. 1. In the example, host system 402 may also include user configuration settings 414 and group configuration settings 416. User configuration settings 414 and group configuration settings 416 may correspond to user configuration settings 114 and group configuration settings 110, respectively, of FIG. 1. In the example, host system 402 may also include user preferences 418 and group preferences 420. User preferences 418 and group preferences 420 may correspond to user preferences 112 and group preferences 108, respectively, of FIG. 1. Client device 422 may correspond to client device 102 of FIG. 1. The specified composition elements 424 may correspond to the composition elements described in block 310 of FIG. 3.

The host system 402 and the client device 422 may be a server, a mainframe, a workstation, a personal computer (PC), a mobile phone, a palm-sized computing device, etc. In some examples, host system 402 may be implemented as a single computing device. For clarity, some components of host system 402 and client device 422 are not shown. Furthermore, although automated image synthesis and composition architecture 400 is illustrated as having one host system, examples of the disclosure may utilize any number of host systems.

It should be noted that content management system 410, image dataset 412, user configuration settings 414, group configuration settings 416, user preferences 418, and group preferences 420 are shown for illustrative purposes only and are not physical components of host system 402. Similarly, specified composition elements 424 are shown for illustrative purposes only and are not physical components of client device 422.

Figure 5:
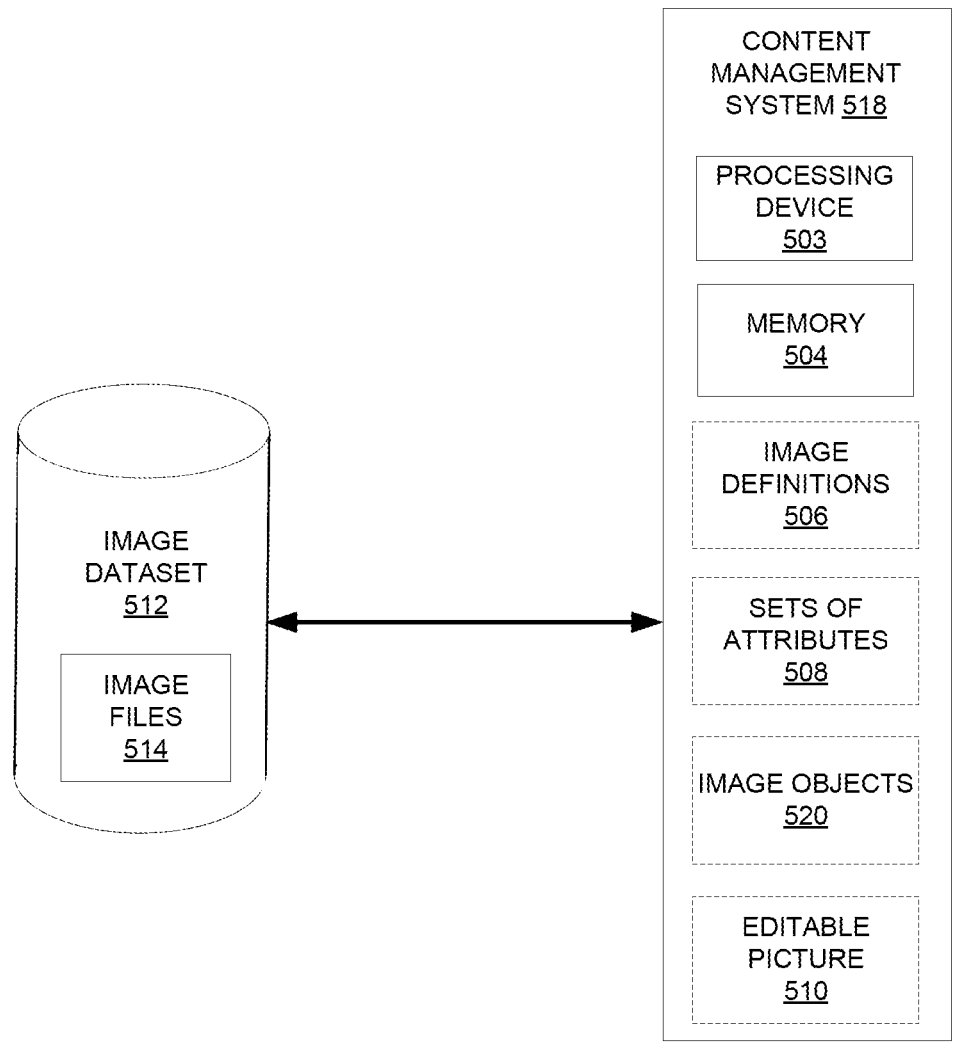
FIG. 5 is a block diagram depicting an example environment for an automated image synthesis and composition architecture, according to some embodiments.

FIG. 5 is a block diagram depicting an example environment for an automated image synthesis and composition architecture, according to some embodiments. The environment 500 includes content management system 518 and image dataset 512. Content management system 518, which may correspond to content management system 104 of FIG. 1, contains processing device 503 and memory 504. Example environment 500 also includes image dataset 512, which contains image files 514. Image dataset 512 may correspond to image dataset 106 of FIG. 1. Content management system 518 further includes image definitions 506, sets of attributes 508, and editable picture 510. It should be noted that image definitions 506, sets of attributes 508, image objects 520, and editable picture 510 are shown for illustrative purposes only and are not physical components of content management system 518.

The processing device 503 of content management system 518 specifies one or more image definitions 506 and one or more sets of attributes 508 associated with the one or more image definitions 506. The processing device 503 searches image dataset 512, using the image definitions 506 and the sets of attributes 508, for one or more image files 514 associated with the one or more image definitions 506. The processing device 503 retrieves one or more image files 514 from the image dataset 512. The processing device 503 composes an editable picture 510 using one or more image objects 520 obtained from the one or more image files 514 and the one or more sets of attributes 508.

Figure 6:
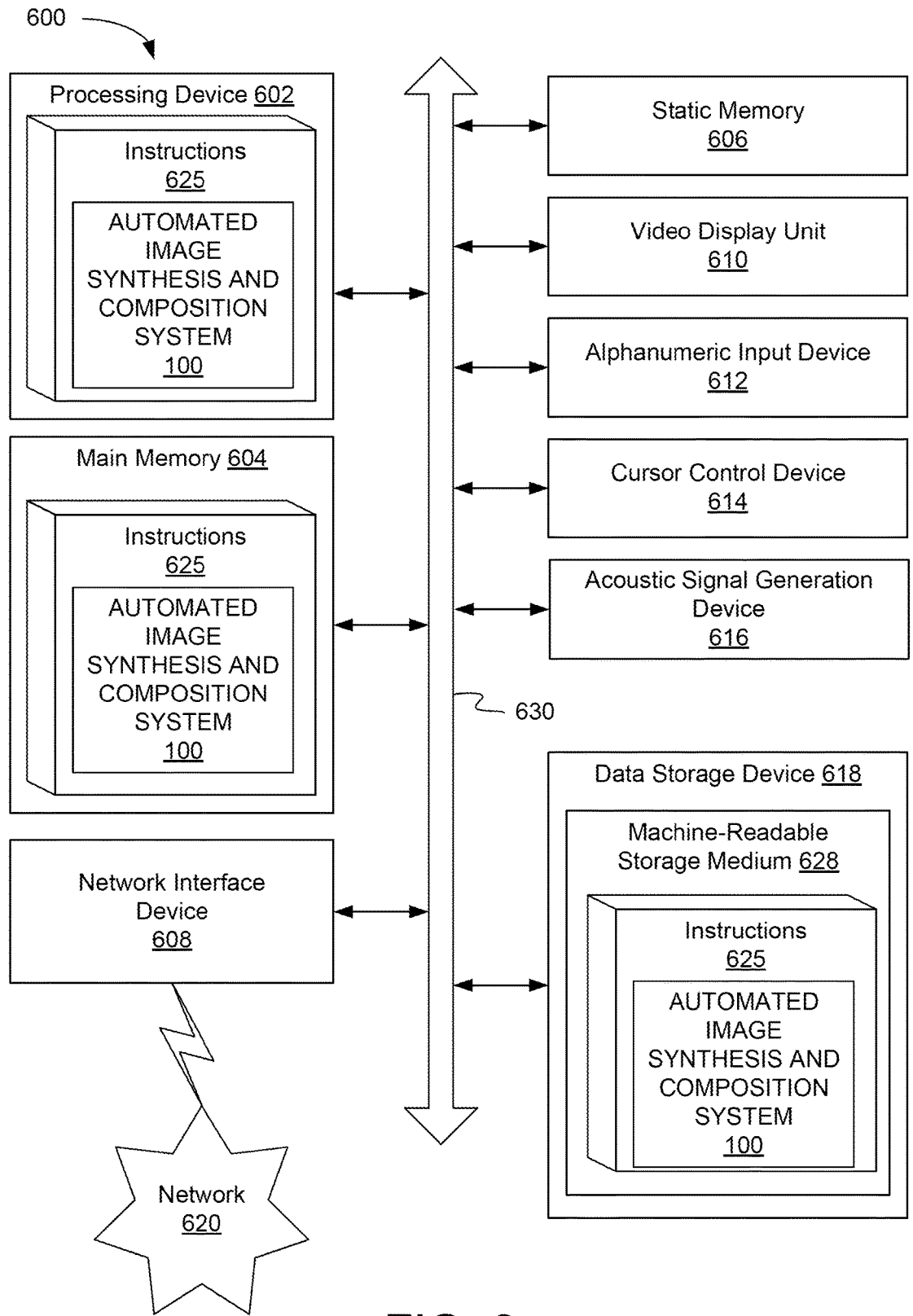
FIG. 6 is a block diagram of an example computing device that may perform one or more of the operations described herein, in accordance with some embodiments of the disclosure.

FIG. 6 is a block diagram of an example computing device 600 that may perform one or more of the operations described herein, in accordance with some embodiments of the disclosure. Computing device 600 may be connected to other computing devices in a LAN, an intranet, an extranet, and/or the Internet. The computing device may operate in the capacity of a server machine in a client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device 602, e.g., a general-purpose processor, a programmable logic device (PLD), a main memory 604, e.g., synchronous dynamic random-access memory (DRAM), read-only memory (ROM), static memory 606, e.g., flash memory, and a data storage device 618, which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 that may communicate with a network 620. The computing device 600 also may include a video display unit 610, e.g., a liquid crystal display (LCD) or a cathode ray tube (CRT), an alphanumeric input device 612, e.g., a keyboard, a cursor control device 614, e.g., a mouse, and an acoustic signal generation device 616, e.g., a speaker. In one embodiment, video display unit 610, alphanumeric input device 612, and cursor control device 614 may be combined into a single component or device, e.g., an LCD touch screen.

Data storage device 618 may include a computer-readable storage medium 628 on which may be stored one or more sets of instructions 625 that may include instructions for an automated image synthesis and composition system 100 for carrying out the operations described herein, in accordance with one or more aspects of the present disclosure. The automated image synthesis and composition system 100 may correspond to the automated image synthesis and composition system 100 of FIG. 1. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media, e.g., a centralized or distributed database and/or associated caches and servers, that store the one or more sets of instructions. The term "computer-readable storage medium" shall also be taken to include any medium capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "specifying," "searching," "retrieving," "composing," "obtaining," "updating," "determining," "displaying," or the like, refer to actions and processes performed or implemented by computing devices that manipulate and transform data, represented as physical (electronic) quantities within the computing device's registers and memories, into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to a particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, and do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times, or the described operations may be distributed in a system that allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure, e.g., circuitry, that performs the task or tasks during operation. As such, the unit/circuit/component can be said to be configured to perform the task, or configurable to perform the task, even when the specified unit/circuit/component is not currently operational, e.g., is not on. The units/circuits/components used with the "configured to" or "configurable to" language include hardware, e.g., circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure, e.g., generic circuitry that is manipulated by software and/or firmware, e.g., an FPGA or a general-purpose processor executing software, to operate in a manner that is capable of performing the task(s) at issue. "Configured to" may also include adapting a manufacturing process, e.g., a semiconductor fabrication facility, to fabricate devices, e.g., integrated circuits, that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present embodiment is not to be limited to the details given herein, but may be modified within the scope and equivalents of the appended claims.

What is claimed is:

1. A method comprising:
specifying one or more image definitions, each of the one or more image definitions corresponding to an object in a picture;
for each of the one or more image definitions, specifying a set of attributes associated with the image definition;
searching, by a processing device, an image dataset using the one or more image definitions and the set of attributes associated with each of the one or more image definitions to locate, for each of the one or more image definitions, a corresponding image file;
retrieving the one or more image files from the image dataset; and
composing the picture using:
an image object obtained from each of the one or more image files; and
the set of attributes associated with each of the one or more image definitions.

2. The method of claim 1, wherein searching the image dataset comprises translating the one or more image definitions and the set of attributes associated with each of the one or more image definitions using natural language processing (NLP).

3. The method of claim 1, wherein the one or more image definitions and the set of attributes associated with each of the one or more image definitions are specified via at least one of:
a configuration file;
a voice command; or
a prompt.

4. The method of claim 1, wherein the sets of attributes specify at least one of:
a proximity; or
an intensity.

5. The method of claim 1, wherein the sets of attributes comprise annotations further comprising atmospheric scenarios.

6. The method of claim 1, wherein composing the picture comprises applying user preferences, group preferences, and a success score.

7. The method of claim 1, further comprising:
in response to composing the picture, updating user preferences, group preferences, and a success score.

8. The method of claim 1, wherein for each of the one or more image definitions, the associated set of attributes comprises positioning information for the image objects within the picture.

9. The method of claim 1, wherein composing the picture comprises changing at least one of:
an orientation of the one or more image objects;
a position of the one or more image objects; or
a layering of the one or more image objects.

10. A system comprising:
a memory; and
a processing device, operatively coupled to the memory, the processing device to:
specify one or more image definitions, each of the one or more image definitions corresponding to an object in a picture;
for each of the one or more image definitions, specify a set of attributes associated with the image definition;
search an image dataset, using the one or more image definitions and the set of attributes associated with each of the one or more image definitions to locate, for each of, the one or more image definitions, a corresponding image file;
retrieve the one or more image files from the image dataset; and
compose the picture using:
an image object obtained from each of the one or more image files; and
the set of attributes associated with each of the one or more image definitions.

11. The system of claim 10, wherein the image dataset comprises a licensed set of image files.

12. The system of claim 10, wherein to compose the picture, the processing device is to arrange the image object obtained from each of the one or more image files on a GUI.

13. The system of claim 10, wherein for each of the one or more image definitions, the associated set of attributes comprises at least one of:
a layering;
a color;
a sizing; or
an aggregate sizing of the one or more image objects within the picture.

14. The system of claim 10, wherein the processing device determines a relative position and an absolute position of the one or more image objects in the picture using positioning and compositing algorithms.

15. The system of claim 10, wherein the processing device updates a success score based on a result of a composition of the picture.

16. The system of claim 15, wherein the success score comprises at least one of:

a quantity of times an image object, obtained from an image file, is used by a user in a final version of the picture;

a quantity of times an image object, obtained from an image file, is used by a group in a final version of the picture; or a quantity of times a suggested composition is used in a final version of the picture.

17. A non-transitory computer-readable storage medium storing instructions that, when executed by a processing device, cause the processing device to:

specify one or more image definitions, each of the one or more image definitions corresponding to an object in a picture;

for each of the one or more image definitions, specify a set of attributes associated with the image definition;

search, by the processing device, an image dataset using the one or more image definitions to locate, for each of the one or more image definitions, a corresponding image file;

retrieve the one or more image files from the image dataset; and compose the picture using:
  an image object obtained from each of the one or more image files; and
  the set of attributes associated with each of the one or more image definitions.

18. The non-transitory computer-readable storage medium of claim 17, wherein the processing device is further to display a preview of the picture, the preview including one or more alternative image objects obtained from the image files.

19. The non-transitory computer-readable storage medium of claim 17, wherein the processing device is further to adjust a transparency of the one or more image objects.

20. The non-transitory computer-readable storage medium of claim 17, wherein the processing device is further to collect metrics on at least one of:

the one or more image files:

an orientation of an image object: or a final composition of the picture.

* * * * *